United States Patent [19]

Zinsmeyer et al.

[11] 4,033,883
[45] July 5, 1977

[54] CONTROL AND DATA SYSTEM

[75] Inventors: Herbert G. Zinsmeyer; Rodney L. Johnson, both of Austin; Ralph H. Genz, Leander; James E. Setliff, Austin, all of Tex.

[73] Assignee: Dresser Industries, Inc., Dallas, Tex.

[22] Filed: Oct. 9, 1975

[21] Appl. No.: 621,259

Related U.S. Application Data

[60] Division of Ser. No. 434,196, Jan. 17, 1974, which is a continuation-in-part of Ser. No. 398,987, Sept. 20, 1973, abandoned.

[52] U.S. Cl. .................... 250/231 SE; 73/194 E
[51] Int. Cl.$^2$ ........................................ G01D 5/34
[58] Field of Search .................. 340/190, 201 P; 250/231 R, 231 SE, 237 R, 234; 324/175; 73/194 E

[56] References Cited

UNITED STATES PATENTS

| | | | |
|---|---|---|---|
| 3,098,152 | 7/1963 | Von Mathes | 250/231 SE |
| 3,534,361 | 10/1970 | Foley et al. | 324/175 |
| 3,729,996 | 5/1973 | Metz | 73/194 E |
| 3,758,949 | 9/1973 | Fausel et al. | 250/231 SE |

*Primary Examiner*—David C. Nelms
*Attorney, Agent, or Firm*—Daniel Rubin

[57] ABSTRACT

A gasoline dispenser control and data system comprising a central office and a plurality of local stations, each station having dispenser control functions, data storage functions and communication functions. The station has a dispenser control mode and data entry mode. In the dispenser control mode a dispenser may be set to dispense gasoline, such dispensing of gasoline resulting in the production of pulses which are accumulated in a counter. The dispenser may then be reset for the next sale. Upon reset the counter is returned to zero, and the previous sale is stored in a temporary memory for recall and display, also being stored in two separate permanent memories, one of which is accessible to the station operator and the other of which is not accessible to the station operator. In the data entry mode the station operator can enter data into some but not all permanent memories. The station data system may be telephoned by the central office and each memory interrogated. The central office may also enter new data in the station data system. Means are provided for interrupting transmission for a limited time for operation of dispensers on a limited basis. Means are also provided for automatically entering data such as the amount of gasoline in storage tanks in the station memory, for "in use" and "ready" signals for each dispenser, and for an emergency off function.

6 Claims, 9 Drawing Figures

CONTROL AND DATA SYSTEM

This is a continuation, division, of application Ser. No. 434,196 filed Jan. 17, 1974entitled Control and Data System, which is a continuation-in-part of application Ser. No. 398,987 filed Sept. 20, 1973,now abandoned.

CROSS REFERENCES TO RELATED APPLICATIONS

This application is part discloses subject matter which is described in greater detail in co-pending Application Ser. No. 388,593, entitled "Level Sensor" filed on Aug. 15, 1973, by Herbert G. Zinsmeyer, Rodney L. Johnson and Ralph H. Genz, and assigned to the same assignee as the present application.

BACKGROUND OF THE INVENTION

1. Field of the Invention

This invention relates to control and data storage systems, and more particularly to such systems as are suitable for controlling the dispensing of liquids and storing and retrieving data relating to the amounts of such liquids which are dispensed.

2. Description of the Prior Art

Retail gasoline service stations commonly are provided with several, e.g. four, gasoline storage tanks, each of which contains a suction or submerged pump to pump gasoline to a plurality, e.g. 16 or more, dispensers for the gasoline. Each dispenser has a hose and nozzle with a hand-operated valve, and a manual switch to turn the dispenser on and off. Counters are provided at the dispenser to create visual displays of the quantity of gasoline dispensed and the total amount of each sale in dollars. Cumulative totals of gallons and dollars are also displayed.

In the retail dispensing of gasoline, self-service stations have become more and more desirable because of the savings in cost of operation. In many such stations the gasoline dispensing device counter drives a pulse generator, the pulses from which are fed to a central monitoring console to produce a remote indication of the amount of gasoline and dollar amount of each sale. Thus a single operator may monitor sales of a number of gasoline dispensers and collect payment for each sales.

To meet the demand for monitoring and control systems for use in such self-service stations, a number of systems have been devised. One of such systems is that disclosed in U.S. Pat. No. 3,598,283 to Krutz, et al which provides means for presetting the sale amount on the pump. A pulse generator at the pump provides pulses which are counted and accumulated at the attendant's console, and a display is provided so that the attendant may view the amount of the sale.

U.S. Pat. No. 3,437,240 to Keeler discloses another system for providing the total of the gasoline sale to a remote location, as does U.S. Pat. No. 3,402,851.

Most of the prior art systems utilize a separate display for each pump, but the system of U.S. Pat. No. 3,632,988 to Tamawaki, et al provides for storing signals from a plurality of pumps in a memory and selectively addressing the memory to provide a display for a selected pump.

In the case of a gasoline retailer who owns a number of stations, particularly stations which are scattered over a wide area, it is often difficult to fully monitor the operations of the stations. It is desirable for planning to be fully advised of sales and marketing conditions at all locations, and to be able to promptly advise station attendants of changes in prices and other marketing practices. Previously such information was obtainable only by time consuming methods, such as mail or telephone transmissions, and the accuracy of information obtained from station attendants was difficult to check.

Systems have been devised for providing various control and monitoring functions between a central office and a plurality of service stations or other dispensing locations. For example, the U.S. Pat. to Jacket No. 3,130,867 discloses a pipeline metering and product delivery control system by which the central office can preset amounts of liquid to be delivered to various locations and can interrogate counters located at delivery locations to determine amounts delivered. A capability of monitoring and controlling a number of stations is provided. Means are provided at the central office for displaying the amounts of sales.

However, no system has heretofore been devised by which a control office can fully and promptly monitor the operations of a number of local self-service gasoline stations, including sales from each dispenser, inventory, and other data important in planning future operations, and can at the same time be assured of the accuracy of the information obtained. Nor has any such system been devised which allows a single station operator to monitor sales on a plurality of dispensers, including temporarily storing data on a previous sale and recalling the previous sale which a further sale is continuing, and at the same time give the operator the capability of instantly determining fuel inventories and levels of water in each of a plurality of storage tanks.

SUMMARY OF THE INVENTION

It is the object of the present invention to provide a control and data system for controlling the dispensing of liquids, monitoring dispensed amounts, accumulating totals of dispensed amounts, and transmitting data to a central office.

More particularly it is an object of this invention to provide a control and data system for a self-service gasoline station in which a plurality of gasoline dispensers may be controlled and monitored, utilizing a digital computer which is programmed for temporary and permanent storage of data from each pump and for recall and display of sales, as well as for storing continuously updated data on the amount of gasoline remaining in storage tanks. Additionally, means are provided for insertion of additional data by the operator or from a remote central office location, and for interrogation of the memory of the computer from the remote central office location.

Another object of this invention is to provide a pump control and data system which will allow resetting of a pump for operation by a second customer and will allow the amount to be added to permanent memory, while allowing the previous sale to be stored in a temporary memory which can be displayed when selected by the operator.

Still another object of this invention is to provide a system by which certain permanent memory locations may be entered by the local attendant while others are secluded from him and accessible only from a central office location, the accessible and inaccessible memory locations including redundant data for verification purposes.

Another object is to provide for operation of gasoline dispensers on a limited basis during transmission of data from the service station to the central office, whereby data transmission periods do not interrupt operation of the service station.

These and other objects of the invention will become more apparent upon consideration of the following description of a preferred embodiment and of the acompanying drawings.

DESCRIPTION OF THE PREFERRED EMBODIMENTS

For the sake of simplicity and ease of understanding, the preferred embodiments of this invention will be described in terms of application of the invention to self-service gasoline stations, although it will be apparent to those skilled in the art that the invention has applicability to dispensing and sale of other liquid products and also of gas and solid products.

The description will also refer to an arrangement involving a central office and plurality of local service stations to which data is sent from a central office and from which data is received upon interrogation by the central office. However, such various combinations and sub-combinations of this invention are applicable to the individual service stations, where no central office is involved, therefore the invention should not be considered to be limited to service stations which communicate with the central office.

GENERAL DESCRIPTION

In the preferred embodiment of the invention which will hereinafter be described in detail, apparatus is provided at a local station for controlling one or more gasoline dispensers, for receiving, displaying and storing data on inventory of gasoline in storage tanks, for transmitting this data and other data inserted by the station operator to a central office, and for transmitting data from the central office to the service station. The term "gasoline dispenser" is used herein in preference to the term "gasoline pump" because of the fact that in most service stations submerged pumps are used to pump gasoline to a plurality of dispensers, and the dispensers themselves do not contain individual pumps.

The usual gasoline dispenser is provided with a flow meter which drives a counter having two outputs, one in gallons and the other in dollars. These outputs are transmitted to separate registers, where they are displayed as they are generated in a visual display, and are also added to a cumulative total display. In some cases such registers are mechanically driven from the flow meter, whereas in other cases a pulse generator, as for example a magnet and a reed switch attached to the shaft of the flow meter, is used to generate signals for the counters. In either event, the counter and register apparatus includes two shaft outputs, one of which rotates at a speed proportional to the gallons register and the other of which rotates at a speed proportional to the dollars register.

According to the present invention, the functions described hereinbefore are accomplished by apparatus which includes pulse generators driven by the proportional dispenser register counter shafts, one pulse generator producing pulses in proportion to the gallons dispensed and the other producing pulses in proportion to the number of dollars registered and displayed at the dispenser. These pulses are transmitted to counters. A console is provided which includes a keyboard and various displays. The keyboard and displays are connected through a central processor unit, which forms a part of a digital micro-computer, to various memory storage locations. The operator may create a display of the number of gallons and the dollar amount of a sale which is in process or which has just concluded at any selected dispenser by merely pressing the numbered keys of the keyboard corresponding to the number of the dispenser. The operator may also create a display of the preceding sale for that dispenser by pressing a recall key. The operator may also reset the dispenser for another sale. Upon reset, both the pulse counters are returned to zero, and the previous sale is stored in a temporary memory for recall and display on the cosole. Upon reset, the amount of the sale is also added to a cumulative total of sales stored in two separate memory locations, one of which is accessible to the station operator and the other of which is accessible only to the central office. Means are provided by which the total amount in the first of these memory locations may be read and written in a third memory location, as for example at the end of each shift, so that the home office can interrogate the station data system at any time during the succeeding shift and determine the total of sales during the preceding shift.

The station data system also has a data entry mode in which the station operator can enter data into some of the memory locations. For example, it may be desired by the central office that the station operator enter data reflecting a competitor's selling prices, weather information, maintenance difficulties, personnel problems, etc.

Means are provided for automatically entering data in selected memory locations reflecting the amount of gasoline in storage tanks at the station, such data being provided, for example, by apparatus such as that disclosed in the aforesaid co-pending application.

In the event of a power failure means is provided for automatically protecting memory. In addition, the apparatus has an emergency shut-off function, whereby the station operator can, in the event of fire or other emergency, shut off all dispenser operations.

The central office is provided with a computer which can interrogate the memories of the station computer, through a conventional telephone line and data coupler, and obtain a readout of data stored in any of the memory locations of the station computer. During such interrogation a lamp is lighted on the station console to indicate that transmitting is in progress. During the transmitting operation the station operator cannot enter data or recall sales information from temporary storage. However, he can temporarily interrupt transmission to reset dispensers and recall previous sales in order to receive payment. Thus even during interrogation by the home office, some operation of station dispensers is permitted.

In the following description a service station having 16 gasoline dispensers and four gasoline storage tanks will be discussed. However, it will be apparent that the apparatus and system may be modified as necessary for a larger or lesser number of dispensers and storage tanks.

Figure 1:
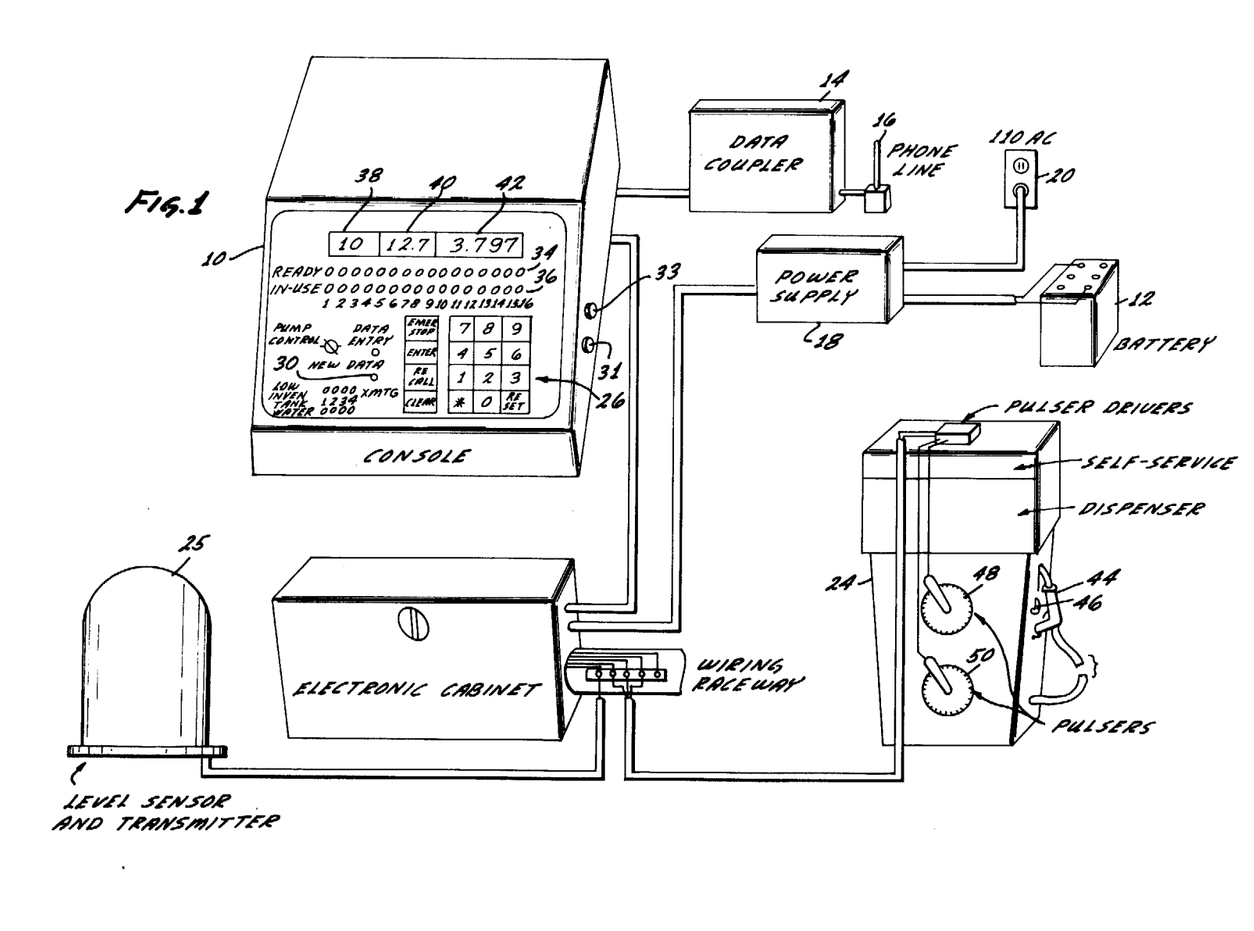
FIG. 1 is an isometric, somewhat simplified view of apparatus for the practice of one embodiment of this invention.

FIG. 1 of the drawing shows pictorially, and somewhat schematically, a preferred embodiment of equipment comprised in the apparatus of this invention. Thus, as shown in this drawing, a console 10 is connected to an electronic cabinet 12 and to a data coupler 14. The data coupler, in the embodiment shown, is connected directly into a telephone line 16. The electronic cabinet is provided with power for a power supply unit 18 which converts and regulates power input from both 110 volt AC source 20 and an auxiliary power supply which may comprise a rechargeable battery 22, which provides power to protect the memory in the event of a power failure. An ordinary 8 volt wet cell may be used, for example. Data is supplied to the electronic cabinet from the dispensers, one of which is illustrated at 24, and from the level sensors and transmitters, one of which is shown at 25.

The console 10 is provided with a conventional keyboard 26, having keys number from 0 to 9, and keys labeled "reset", "*", "emergency stop", "enter", "recall" and "clear". A key operated switch 28 has two positions, "pump control" and "data entry". A panel light 30 is provided for indication of the existence of transmission from the station to the central office, and a panel light 32 is provided for indication of transmission of new data from the home office to the station. A "shift-change" push-button is provided at 33, and a "transmit-interrup" push-button is provided at 31.

A plurality of "ready" and "in-use" panel lights 34 and 36, respectively, are provided, one for each gasoline dispenser. The console also has provision for display of three different numbers at 38, 40 and 42. At location 38 two numerals may be displayed, at location 40 three numerals may be displayed, and at locaton 42 five numerals may be displayed. The display may utilize conventional seven segment displays (light emitting diodes such as Monsanto's MAN-10), nixie tubes or any other suitable display device.

The dispenser 24 has the conventional hose and nozzle 44 and the conventional manual switch 46 which must be turned on before any gasoline can be dispensed. In addition, the dispenser is provided with an encoder 48 to provide pulses indicative of the number of dollars of the sale and an encoder 50 to provide pulses indicative of the gallons of gasoline dispensed.

Figure 2:
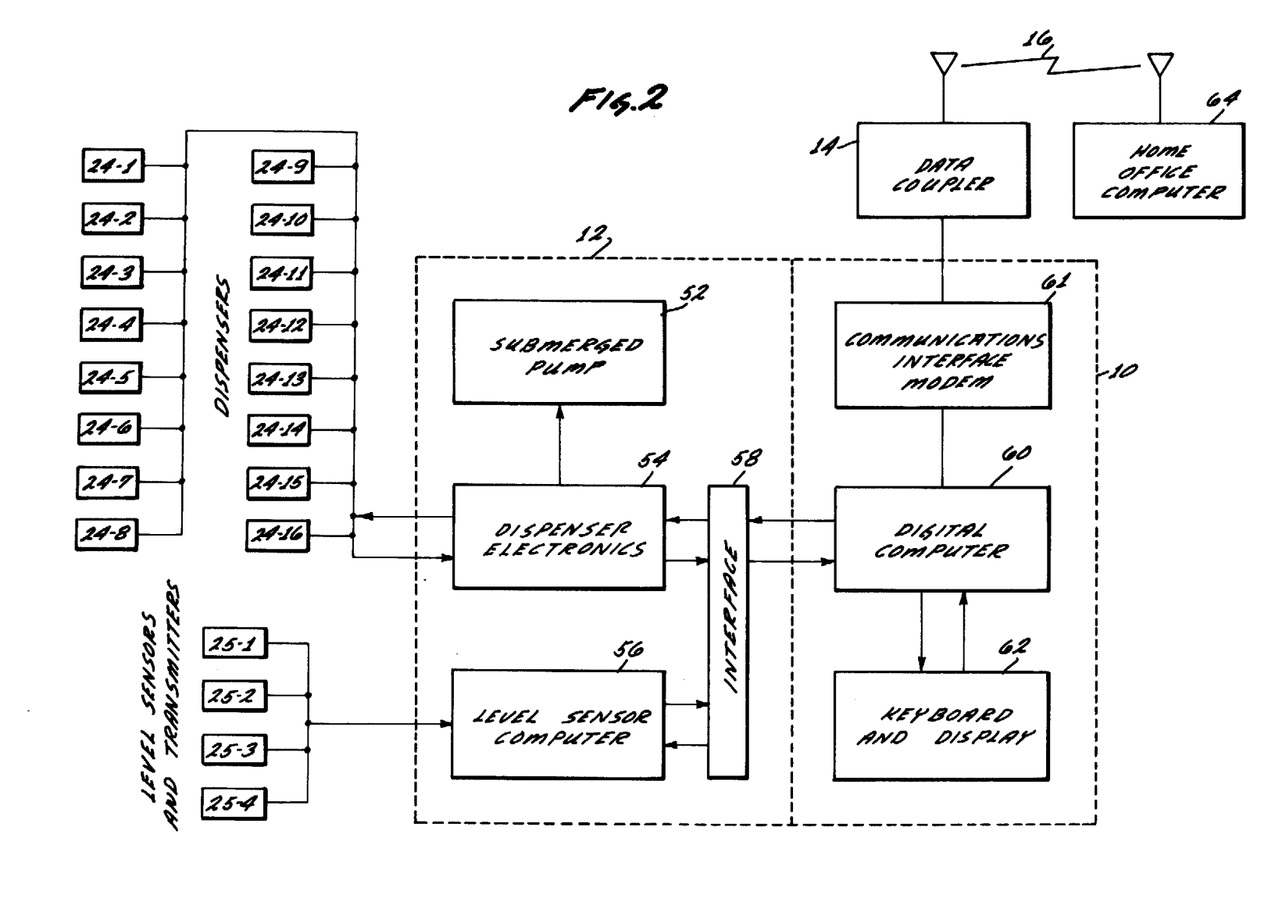
FIG. 2 is a block diagram of the major components of one embodiment of the apparatus of this invention.

In FIG. 2 the major components of the apparatus of this invention are shown in block diagram. Thus 16 different dispensers are shown, numbered 24-1 through 24-16, and four different level sensors and transmitters are shown, numbered 25-1 through 25-4. The dispensers are provided with fuel by one or more submerged pumps 52. The dispenser electronic system 54 is connected to receive signals from the dispensers and also to feed signals to the dispensers. In addition, the dispenser electronic system provides signals to energize the submerged pumps so that gasoline may be pumped to the dispensers when required. As will later be explained, means are also provided for selectively operating the dispensers independently of the electronic system, so that a signal may be sent directly from any one of the dispensers to the submerged pump to cause it to operate.

The output of the level sensor transmitters is received and processed in the level sensor computer 56, one form of which is disclosed in the aforesaid co-pending application.

Data from the dispenser electronic system 54 and from the level sensor computer are fed through an interface 58 which provides suitable connection to a digital microcomputer 60 and keyboard and display apparatus 62. The digital computer 60 communicates with a home office computer 64 see FIG. 2) through a communication interface modem 61 and a conventional data coupler 14, as by means of the telephone line 16 or by means of radio transmission or the like.

DISPENSER ELECTRONICS

Figure 3:
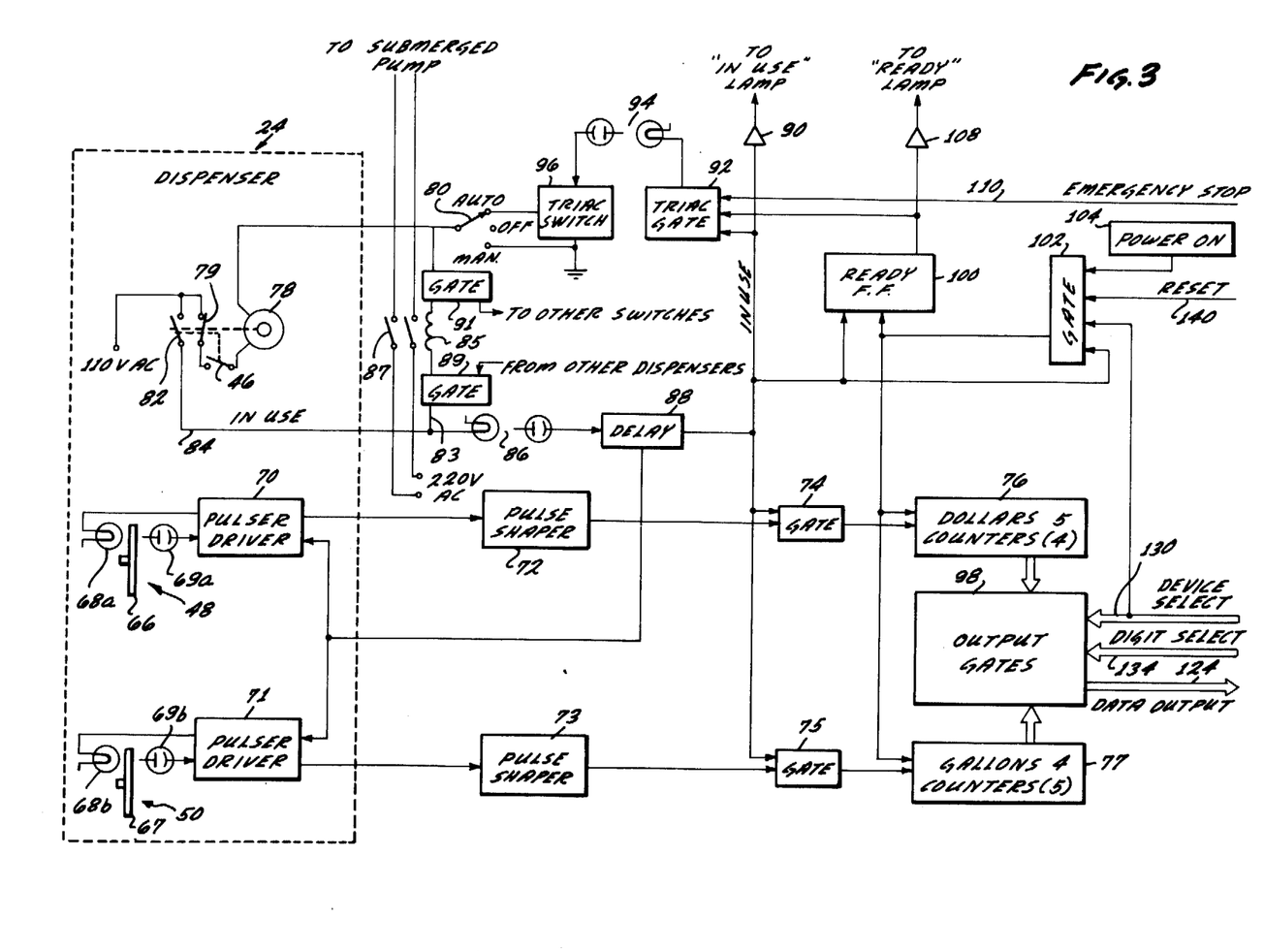
FIG. 3 is a block diagram of electrical circuitry associated with each dispenser according to one embodiment of this invention.

FIG. 3 shown schematically and in block diagram the electrical circuitry utilized in the operation and monitoring of a single dispenser 24. The same or similar circuitry is used with each of the other dispensers.

As previously noted, the dispenser 24 contains encoders 48 and 50 which, in the preferred embodiment, comprise perforated discs 60, 67 mounted on output shafts on the dispenser counter (not shown) for rotation so that the perforations of each disc pass between a light emitting diode (LED) 68 and a photo transistor 69, each LED and photo transistor forming a photocoupler which is used as an encoder in the preferred form of this invention. Other types of encoders known in the art may be used, as for example, the type which utilizes rotating magnets and a reed switch, but the perforated disc type encoder just described is preferred for its accuracy. A variety of photocouplers are available on the market which are suitable for use in this application. One example of such a photo coupler is that manufactured and sold by Spectronics, Inc., as Part Nos. SD-1440-3 and SE-1450-3.

Pulser drivers 70, 71 are connected to the photocouplers, providing an output current to the LEDs and receiving, amplifying and transmitting pulses from the photo transistors. The outputs from the pulser drivers 70, 71 are fed through the pulse shapers 72, 73, respectively, which are basically Schmitt triggers. The pulse shapers introduce hysterisis into the signals in order to reject electrical noice, and to compensate for unwanted mechanical jitter or vibration of the disks 66 and 67. The output pulse trains from the pulse shapers are sent through gates 74, 75, respectively, and then to the dollars counters 76 and the gallons counters 77. These preferably comprise decade counters which store the counts in 4-bit binary coded decimal (BCD) form.

The dollars encoder 48 is preferably designed to emit a pulse for each 0.001 dollars value of fuel dispensed, and the gallons encoder 50 is preferably designed to emit a pulse for each 0.01 gallon of fuel dispensed. In order that the counters may count up to $99,999 and up to 99.99 gallons, the dollars counters comprise five decade counters and the gallons counters comprise four decade counters. Data is transferred from these decade counters through a gating circuit 98.

It will be noted that although the gallons counter provides four significant figures, only three are provided on the display. This issufficient for sales purposes, since customers are not interested in hundredths of a gallon and the tenths digit is rounded up or down to the nearest tenth. However, the totals stored in memory are accurate to a hundredth of a gallon. Dollars are displayed to three decimal places, so that the price charged can be adjusted to the nearest cent.

As is well known in the art, the counters in gasoline dispensers must be reset to zero following each sale before additional gasoline can be dispensed. The reset is accomplished by means of a manual switch adjacent to the nozzle receptacle, as shown at 46 in FIG. 1. The operation of this switch closes a circuit in which a reset motor 78 (see FIG. 3) is connected, so that the reset motor runs to reset the counters to zero. The reset motor shaft drives a cam which, when the dispenser counters have been reset to zero, engages a normally closed switch 79 in the reset motor circuit, thereby opening the switch so that the reset motor stops. Switch 79 is mechanically connected to a normally open switch 82, so that when switch 79 is opened, switch 82 is closed. Switches 79 and 82 are also connected to a manual switch 46, so that switch 79 is closed and switch 82 is opened when switch 46 is opened.

According to the present invention, an additional switch 80 is provided in the reset motor circuit. Switch 80 is a three-position switch which may be set at any of "automatic", "off" and "manual". When set at manual the reset motor circuit is grounded and the dispenser may be operated in the normal manner, without being reset from the console. When set at off the dispenser may not be operated at all, and when set at automatic the control system of the present invention becomes effective.

When switch 82 is closed, in either the manual or automatic mode an "in use" signal is present in conductor 84. A tap 83 off this conductor to ground through switch 80 contains a relay coil 85, which, when an in use signal is present, holds relay switches 87 closed, to provide 220 volt AC to operate the submerged pump. The tap 83 also contains diode wired "OR" gates 89 and 91, which are connected to corresponding taps 83 of other dispensers of the same grade of gasoline, so that a single relay coil 85 and switch 87 may be used with a single pump for each grade of gasoline.

An isolator comprising a photocoupler 86, such as, for example, Monsanto's No. MCT2E, provides electrical isolation between the power line voltage level in line 84 and the low logic voltage level of the remainder of the circuit. The output of the photocoupler isolator is sent to a delay network 88 which produces an in use output signal coincident with the in use signal at its input, but which delays the cessation of the in use a short time (preferably approximately 1.5 seconds) relative to the cessation of the in use signal at the input of the delay network. This delay allows continued transmission of any pulses generated after switch 46 is opened, as may occur if this switch is opened while the nozzle is dispensing gasoline. The in use output from the delay network is sent to a lamp driver 90 which illuminates one of the lamps 36 one the console to inform the operator that this particular dispenser is being used.

The in use indication is also sent to a triac gate 92. The output of the triac gate is an enabling signal which is sent through a photocoupler isolator 94, such as, for example, General Electric Company's No. H11C1, to a triac switch 96. The triac switch provides a connection to ground for the reset motor circuit and relay coil 85 when the switch 80 is on automatic.

The in use signal to the pulser drivers 70 and 71, serves as a control signal to enable the pulser drivers (through an optical isolator that provides electrical isolation to meet intrinsic safety requirements for hazardous environments.) The in use signal sets the ready flip-flop 100 to not ready, and the gate 102 which prevents a reset signal from setting the ready flip-flop 100. The in use indication is also sent to the gates 74 and 75 where it enables these gates and allows the pulses from the pulse shapers 72 and 73 to be entered into the decade counters 76 and 77. The in use signal is generated even when the switch 80 is on manual, therefore if the dispenser is operated in the manual mode generated pulses will be counted at the counters 76, 77.

Other components depicted in FIG. 3 will now be described although the function and operation of these components will not be described in detail until after a description of the components shown in FIG. 4. Thus gating circuitry 98 is provided for reading out the stored BCD count of the counters 76 and 77. A ready flip-flop 100 receives as one of its inputs the in use signal and as the other of its inputs a signal from gate 102 which is enabled by a power on signal from circuit 104, or by a "device select" signal accompanied by a reset signal when there is no in use signal present. After a power failure, upon restoration of power the "power up" circuit sends a pulse to all of the decade counters as 76, 77, to cause all outputs on the counters to read zero. This is necessary, since whenever electrical power is first supplied to the integrated circuits utilized in the preferred embodiment, the output of the counters is unpredictable.

The output from the ready flip-flop 100 is fed to a ready lamp driver 108 to cause illumination of the ready lamp 34 on the console, and is also fed as an input to the triac gate 92. The third input to the triac gate is the emergency stop input, supplied through conduit 110.

STATION ELECTRONICS

Figure 4:
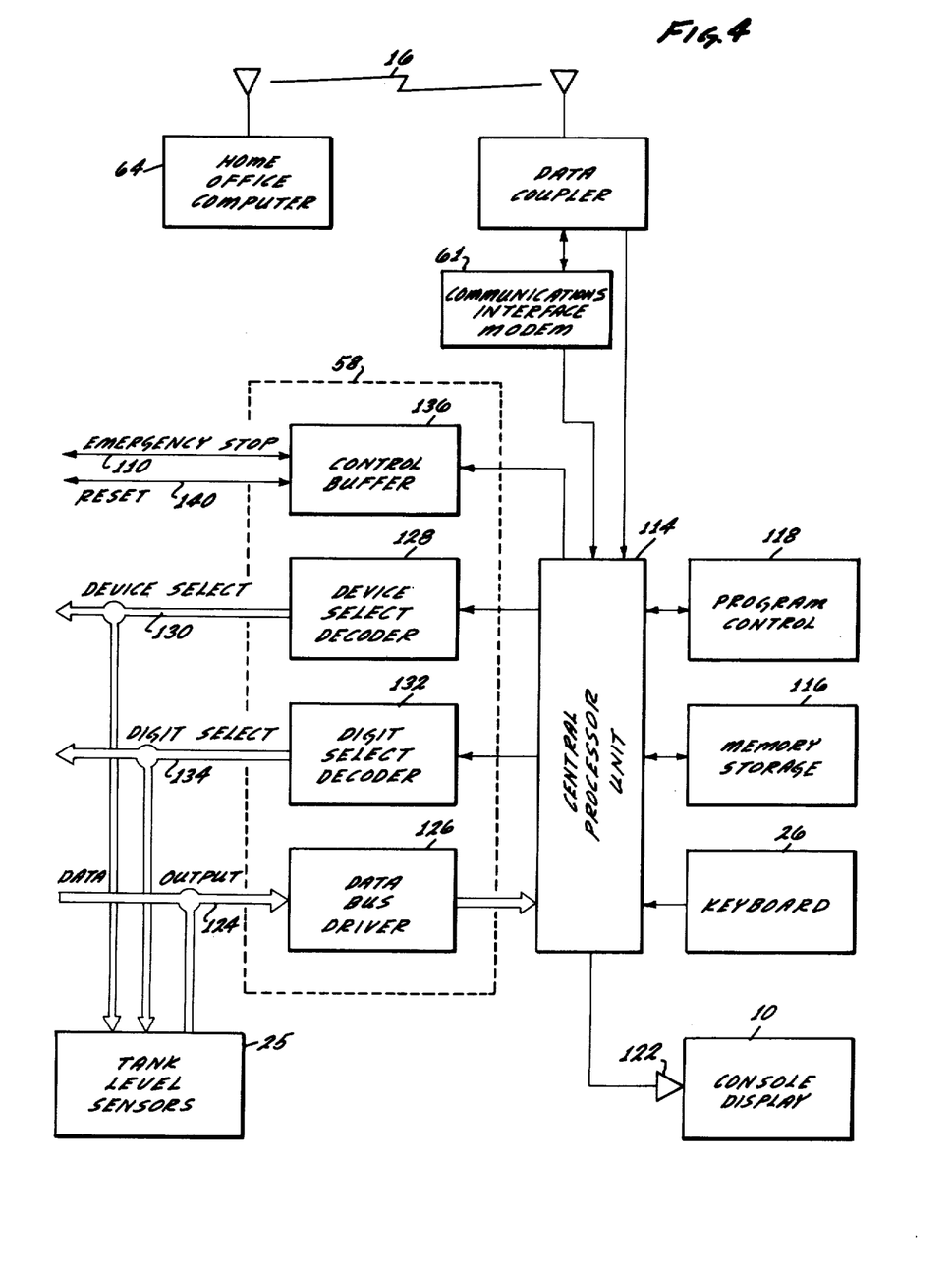
FIG. 4 is a block diagram of apparatus for receiving, storing, processing, displaying and transmitting data from the dispensers.

FIG. 4 depicts the service station electronic system which is connected through the interface 58 to each of the dispenser electronic systems, as depicted in FIG. 3.

The heart of this sytem is a micro-computer system, such as the MCS-4 produced by Intel Corp. of Santa Clara, California and described in Intel's User's Manual dated March, 1972. This set includes a central processor unit 114, memory storage 116 and program control 118. The central processor unit (CPU) communicates with the home office through the communications interface comprising the modulator-demodulator (modem) 61 and the data coupler 14. The data coupler may, for example, comprise a type 1001A CBS, available on lease from the Bell Telephone Company, and the modem may be a Tele-Dynamics Model 7113B.

Instructions are provided through the CPU from the keyboard 26, as shown in FIG. 1, and data selected for display by the keyboard is decoded from BCD to decimal by the CPU and displayed, through the driver 122, at the various displays of the console 10.

To transfer the contents of a counter 76, 77 of one of the dispensers or data from one of the tank lever sensors 25 to the CPU, a data bus 124 is provided. Data transmitted is multiplexed to transmit one digit at a time, since speed of transmission is not important. The data bus consists of four parallel electrical signal conductors which are connected in a parallel electrical manner; that is, each of the four conductors is electrically connected to each of the 16 output gates of the 16 dispensers, and to each of the four level sensors. Thus the four signal conductors of the data bus transfer in parallel, simultaneously, the four-bit BCD output of either one of the counters or one of the level sensors. A data bus driver 126 is provided for transfer of such data into the CPU.

The counter or level sensor whose data is to be transmitted is determined by a "device select" signal which is created by pressing identifying keys on the keyboard. The CPU, in response, feeds an identifying signal to the device select decoder 128, which decodes the signal and produces an input device select signal to the dispenser counter board or tank level sensor selected. The CPU is programmed to multiplex transmission of data, and therefore sends a series of "digit select" signals to the digit select decoder 132 which provides an output signal through one of four digit select conductors 134. A control buffer 136 comprises a driver for signals transmitted from the keyboard through the CPU, to provide an "emergency stop" signal through conductor 110 and a reset signal through conductor 140.

In a data system for 16 gasoline dispensers and four gasoline storage tanks, a memory having, for example, 160 memory locations will provide adequate capacity. Each location should be capable of storing eight BCD digits of 4 bits each, i.e. 32 bits. Memory locations may, for example, be used as follows:

| | |
|---|---|
| 0 | Spare |
| 1-16 | accumulated dollars for each of 16 dispensers |
| 17-32 | accumulated gallons for each of 16 dispensers |
| 33-36 | gasoline levels in each of four storage tanks |
| 37 | spare |
| 38-74 | data read from locations 1-37 at end of shift |
| 75-106 | spare |
| 107-110 | gasoline levels in each of four storage tanks |
| 111 | spare |
| 112-127 | accumulated dollars for each of 16 dispensers |
| 128-143 | temporary storage, dollars, for recall |
| 144-159 | temporary storage, gallons, for recall |

OPERATION

The system of this invention has two modes of operation, i.e. "pump control" and "data entry", as determined by the switch 28 on the console. A lock switch is preferred to prevent entry of data by unauthorized persons. In the data entry mode program control provides that the station operator may enter data at any of memory locations 0 to 99 by pressing keys corresponding to the selected memory location, and then following this by pressing keys corresponding to the data to be entered. The enter key is then pressed to enter the data. Preferably only two digits are provided for addressing memory locations, so that the operator is limited to addressing locations 0 to 99. Data in BCD form containing up to eight digits may be entered in the memory locations. In this mode of operation the program control prevents any resetting of the dispensers and prevents any read-out of data from the dispenser counters or the level sensors, but the dispensers and dispenser counters are not inhibited from operation.

In the data entry mode, various of the spare memory locations listed above may be designated for entry of particular specified data. For example, memory location 0 may be used for the station telephone number or other identification, and memory location 75 mayf be used to show the selling price of a particular competitor.

As the keys are pressed, first the memory location identification will appear at display 38 on the console, and then the other data entered, which is at this point held in temporary memory in the CPU, will appear at displays 40 and 42. The operator may thus check his entry to be sure that it is accurate and then press the enter key to enter the data in permanent memory. If the display indicates that the entry is wrong, it may be removed by pressing the "clear" key. Data already in a memory may be displayed by addressing the appropriate memory location and pressing the "recall" key.

When the system is first installed, it is desirable that the accumulated dollars and accumulated gallons stored in memory locations 1 to 32 be identical to the accumulated totals shown on the dispenser totalizer registers. This data is entered in memory for each dispenser with the switch 28 turned to the data entry mode. Thus for dispenser 10 the number 10 is first designated by means of the keyboard so that the number 10 appears at display 38. Keys corresponding to the number of dollars shown on the dispenser register are then pressed, this total number being displayed at displays 40 and 42. When the numbers are checked, the enter key is depressed to enter these in memory.

Memory location 26 is then addressed and keys corresponding to the number of gallons accumulated on the dispenser register are depressed and this amount is entered. When all dispensers are initialized, key switch 28 may then be turned to pump control and the system is ready for operation. The program control prevents the entry of any data from the keyboard in the pump control mode.

Initially, each dispenser must be reset to prepare the dispenser for operation. The initial power up causes the delay circuit 88 to emit an in use signal for a short period, thereby turning the ready flip-flop 100 to not ready. Thus it is necessary to reset each dispenser by depressing keys on the console corresponding to the numbers of each of the dispensers, in each case followed by pressing the reset key. The power up circit will initialize the counters to all zeros and the data stored in memory locations 1-32 will not be disturbed by resetting the dispensers. In the pump control mode the pressing of keys corresponding to a particular pump number provides, through the CPU and the device select decoder 128, a device select signal which is supplied to the output gates 98 of the selected dispenser and to the gating circuit 102 which turns on the ready flip-flop 100.

The ready flip-flop 100 is set to not ready by an in use signal, and is reset to ready by a signal from the gating circuit 102. This gating circuit, as previously noted, is enabled by the presence of a reset and device select signal with no in use signal, or by a power up signal. This switches the ready flip-flop to a ready state so that an output is provided to the ready lamp through the lamp driver 108. In addition, a ready signal is provided to the triac gate 92, which allows a dispenser to be used.

The initiation of an in use signal, which occurs when switch 82 is closed after the reset motor cycle initiated by closing manual switch 46, changes the state of the ready flip-flop 100 to the not ready state. In addition, the in use lamp is energized, and the gates 74, 75 leading to the decade counters 76, 77 are enabled so that pulses from the pulse generators 48, 50 may be counted. The in use signal also has an input to the triac gate 92. This gate is enabled if there is either an in use or a ready signal, together with no emergency stop signal. The in use signal continues to activate the triac gate 92, the photocoupler isolator 94, and the triac switch 96. When switch 82 is closed, relay coil 85 is activated so that switches 87 are closed to supply current to the submerged pump motor.

When the dispenser operation ceases and the customer turns off the manual switch 46, the in use signal disappears, after a short delay, by virtue of switch 82 being opened, and the triac gate 92 is no longer enabled. Thus once the dispensing has been completed for one sale, the triac switch 96 will open and will remain open until a reset command is received from the CPU. The triac switch remains open because the ready flip-flop is not reset to ready until the reset command is received. The mere closing of manual switch 46 will not provide an in use signal because the triac switch is open and therefore the reset motor circuit is not closed to ground. Thus, once the triac swich opens, there must be a reset command generated by the CPU to reset the ready flip-flop and thereby enable the triac gate, which then closes the triac switch before the dispenser can again dispense fuel. The reset command is initiated by a key on the keyboard, but it is not sent to the ready flip-flop by the CPU until the contents of the decade counters 76, 77 have all been transferred by means of the data bus 124 to the CPU. When this transfer has occurred, the CPU issues the reset command to the gating circuit 102 and thus to the ready flip-flop, thereby providing an enabling signal to the triac gate and closing the traic switch, and to the counters 76, 77 to reset them to zero. Thus the reset command both resets the counters and returns the dispensers to the ready state.

To reduce electrical power and data processing requirements, the operational format of the CPU selected for use in the preferred embodiment of the present invention reads out the contents of a single decade counter of counters 76, 77 at a time and from only one dispenser at a time.

The readout and reset of the counters 76, 77 upon pressing the reset key on the keyboard is provided through program control. Thus the CPU selects a particular device address code in response to the pressing of keys on the keyboard identifying the device which is being reset. For the preferred embodiment disclosed, a total of sixteen dispensers and four underground fuel storage tank sensors can be monitored. The addresses of these inputs are stored in binary form, so a five bit binary address format which can handle up to thirty-two separate addresses is used to address these twenty inputs. A device select decoder 128 comprising a 5-to-20 decoder selects one of the sixteen dispensers or one of the four tank level sensors for reading into the CPU. This signal enables the four output gates 98 of the particular selected device, which follow the four bit parallel BCD data from a particular counter enabled to be read. But in the preferred embodiment, in order to transfer out the four bit parallel BCD data, a digit select signal must be present also. The digits are selected in sequence by the program control. Thus, for selecting which of the nine decade counters in counters 76, 77 is to be read out, a 4-to-10 digit select decoder 132 is used. The output of each decade counter is a four bit BCD word which represents one of the nine decimal digits contained in the nine counters. The four bit output is read simultaneously in parallel from the selected counter. Likewise, a four bit parallel output is available from each tank level sensor.

It should be noted that although both a device select and a digit select must be sent to a dispenser counter board in order to transfer data to the data bus for transmittal to the CPU, neither signal is required to operate the dispenser or for the counters to receive and count encoder pulses.

While a sale is in progress, or after the sale is completed but before reset, the amount of the sale can be displayed by depressing the keys identifying the particular dispenser. The program control thus causes device select and digit select signals to be supplied to the output gates 98 for reading of the contents of the counters 76, 77, but no data is transferred to memory. Upon reset the program control causes the totals in the counters to be added to the contents in memory of memory location 1 to 32 for the particular dispenser. At the same time the dollar amount in the counter 76 is added to the amount in the appropriate memory storage of addresses 112 to 127. In addition the amounts in the counters are temporarily stored in the appropriate ones of memory locations 128 to 159.

Then by pressing keys corresponding to the dispenser number and the recall key, the amount of the previous sale can be displayed.

Upon completion of the next sale and an additional reset, the amounts in the temporary storage are replaced by the amounts of the new sale.

An emergency stop command is received by the control buffer 136 whenever the operator depresses the emergency stop key on the keyboard. Whenever this occurs the triac gate is inhibited, thereby causing the triac switch to open. The emergency stop command is sent to all dispenser counter boards simultaneously.

Electrical power is supplied to the relay coil 85 through OR gate 89 from any dispenser of the same grade. Thus the relay coil 85 activates the switches 87 and the submerged pump whenever any dispenser of the same grade is operated. OR gate 91 is used to allow each reset motor to be controlled independently, but not disable the relay coil 85 is another dispenser of the same grade is in operation. If an emergency stop command is issued by the CPU, all triac switches are opened to disable all submerged pumps.

The submerged pump motor is also cut off if none of the dispensers is in use. As explained above, after the dispensing operation is completed for each sale, neither the ready nor the in use signal is present at the input of the triac gate to enable it and therefore the triac switch for that dispenser opens. Hence, if none of the dispensers for one grade of gasoline is in use, then all triac switches for those dispensers are open and the submerged pump motor for that grade of gasoline is turned off.

Upon completion of a sale at a dispenser, the station operator may determine the amount of the sale in order to receive payment by merely pressing keys corresponding to the dispenser number. For example, to display the amount of the sale just completed at dispenser 24-10, the operator addresses 10. Under program control, this produces a display of the dispenser number (10) and the totals of both of the counters 76 and 77 for dispenser 24-10.

If a new customer wishes to use the dispenser before payment has been received for the last sale, the dispenser and its counters may be reset to zero by pressing keys addressing the particular dispenser, and then the reset key. This causes the totals in the counters 76 and 77 for dispenser 24-10 of the above example, to be stored in temporary memory locations 137 and 153, respectively, following the scheme of memory locations shown on page 21, and also causes these totals to be added to the accumulated totals in memory locations 10 and 26, respectively. The dollars count from counter 76 for dispenser 24-10 is also added to the accumulated total in memory location 121 as described earlier. The previous sale can then be recalled from temporary storage by pressing the dispenser number and the recall key, and the gallons and dollars of the previous sale is thereby displayed.

In a preferred embodiment of the invention, program control causes the displays 38, 40 and 42 to blink if keys are pressed in the wrong order to two keys are pressed at the same time. The display may be cleared at any time by merely pressing the clear key.

The operator may determine the amount of fuel in any of the storage tanks by switching to the data entry made and then pressing keys addressing the memory locations of these storage tanks (e.g. one of locations 33-36) and pressing the recall key. This will cause the display of the amount of fuel in the selected storage tanks.

In a preferred embodiment of the invention, the respective signals from the level sensors are interpreted and indicator lights on the console panel are energized to display low inventory and water in tank warnings. The level sensor is disclosed in full detail in co-pending application Ser. No. 388,593.

As previously noted, the operator may enter data in any of memory locations 0-99, and data is temporarily stored in locations 128 to 159 for recall. However, memory locations 100-127 are accessible only to the central office. Thus, to provide a check on the data in memory locations 1-16 and 33-36, to determine whether any erroneous data has been entered, redundant memory locations 112-127 and 107-110 are provided.

At the end of a shift, or at other times as desired, the data stored in memory locations 1-37 may be read and written in memory locations 38-74. This is accomplished through program control by pressing pushbutton 33 on the console. This data is therefore preserved for reading at any time during the succeeding shift.

As previously noted, communication with the home office computer is performed in a conventional manner through a data-coupler and, for example, a telephone line. The home office computer is programmed to telephone the station and, after identifying signals, transmit a "transmitting" signal to the station computer. By program control, a XMTG light 30 is illuminated on the console, and the CPU, keyboard, and related station equipment is inhibited from operation. However, the dispensers and their counters may continue to operate. The station operator may interrupt transmission for a limited time e.g. 15 seconds, if desired for the purpose of displaying a sale, resetting a dispenser or recalling a previous sale. This is accomplished by pressing the transmission interrupt push-button 31 on the console. Through program control, the home office computer is instructed to stop transmitting. Transmission automatically resumes at the end of the transmission interrupt period.

In the event of any emergency, e.g. fire, gasoline spillage, severe windstorm, etc., the station operator has the capability of completely shutting down all dispensers and pumps, without disturbing memories, by pressing the Emergency Stop Key. Under program control, this causes the CPU to send a pulse to the triac gate 92, disabling the gate so that no signal is sent to the triac switch 96, and the switch is thus opened.

The home office computer may also enter data in the memory of the station computer. When doing so, the home office computer transmits a signal to illuminate the "new data" light 32 on the console. After transmission, such data may be viewed by the station operator by pressing keys to address the appropriate memories, and pressing the recall key. The new data light may be turned off by pressing the key marked *.

The program control involves only conventional operations, familiar to computer programmers; therefore it is not necessary to set forth the program herein. The invention does not lie in the program, but in the control and data system itself, particularly as applied to self-service gasoline stations, and various chain operations, some of which may use only the manual data input and telephone communications.

DETAILS OF COMPONENTS AND STAGES PREVIOUSLY DESCRIBED SOMEWHAT SCHEMATICALLY

Figure 5:
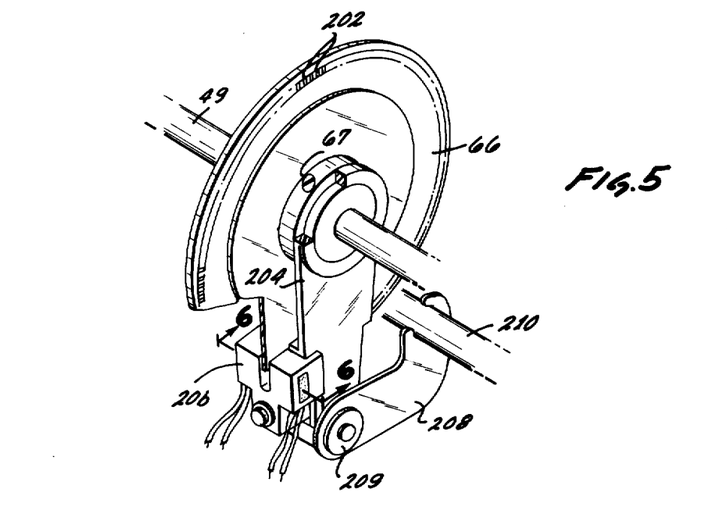
FIG. 5 is a perspective view of apparatus included at the dispensers at a self-service station for converting rotary motion of the counting mechanism at the dispensers into electrical signals for transmission to a central position at the station.
Figure 6:
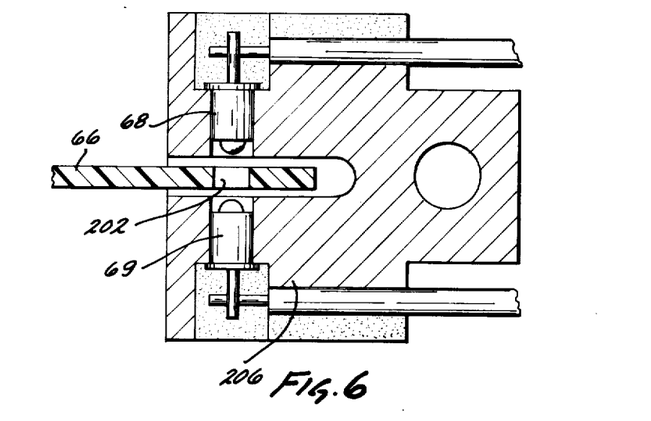
FIG. 6 is a sectional view of the apparatus shown in FIG. 5; and is taken substantially on the line 6—6 of FIG. 5.

FIGS. 5 and 6 illustrate apparatus for converting mechanical indications provided by the encoders 48 and 50 in FIG. 1 to electrical signals digitally representing such mechanical indications. For example, as the encoder 48 is rotated to indicate the monetary value (price) of the product dispensed by the dispenser 24 and its mechanical computer, the apparatus shown in FIGS. 5 and 6 is operated to produce electrical pulse signals. The pulses are counted which represents the value of fluid dispensed. Similar apparatus to that shown in FIGS. 5 and 6 may be provided to produce electrical pulse signals which represents the volume (gallons) of such product dispensed as indicated by the encoder 50.

As shown in FIGS. 5 and 6, the rotary disc 66 (also shown in FIG. 3) is mounted on the dollars rotary shaft 49 of the dispenser mechanical computer by means of set screws 67 for rotation with the shaft, and is provided with equally spaced apertures 202 around its periphery. A forked frame 204 embraces the rotary disc 66 at the hub on both sides, and supports a replaceable slotted block 206 at the periphery of the disc 66. A frame anchoring brace 208 is fixed to a stationary pin 210 of the dispenser mechanical computer at one end and is attached at the other end as at 209 to the forked frame 204 in pivotal relationship to the frame.

The light-emitting diode 68 (also shown in FIG. 3) is disposed in a mounting hole in one side of the replaceable block 206, as shown in cross-section in FIG. 6, and the transistor 69 (also shown in FIG. 3) is similarly disposed in the opposite side of the block 206 to face the diode across the slot. The block 206 is indexed and affixed to the frame so as to position the diode and transistor at the radial position of the apertures 202 in the disc 66. In this way an electrical signal is produced by the transistor 69 as each aperture 202 moves between the diode 68 and the transistor 69. This signal is introduced through leads to the gates 74 and 75 and to the counters 76 and 77. These digital signals represent progressive increments in the price of the product dispensed by the dispenser.

Figure 7:
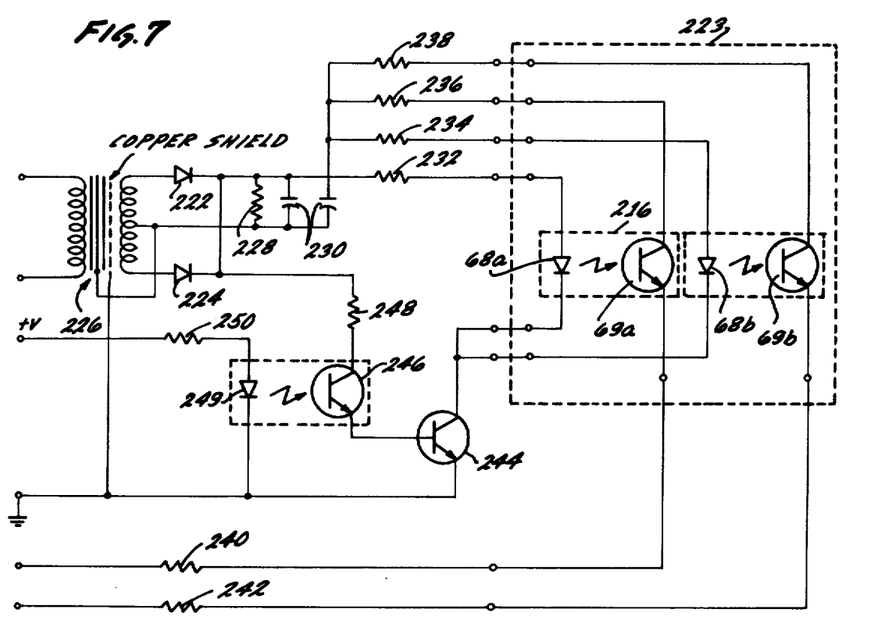
FIG. 7 is a circuit diagram of certain stages shown on a somewhat schematic basis in FIG. 3.

The light-emitting diode 68 and the transistor 69 are schematically shown in FIG. 7 as 68a and 69a for the encoder 48 (FIG. 1) to distinguish them from corresponding elements shown in FIG. 3 for the "gallons" encoder 50. The diode 68a and the transistor 69a are shown in FIG. 7 as being enclosed within a box 216 in broken lines, this box corresponding to the block 206 shown in FIGS. 5 and 6 and described above. Similarly, a diode 68b and a transistor 69b are associated with each other in a relationship corresponding to the diode 68a and the transistor 69a to produce signals corresponding to increments in the volume (gallons) of the fluid dispensed in an individual dispenser.

The diodes 68a and 68b are adapted to receive voltage from a full-wave rectifier formed in part by a pair of diodes 222 and 224 and the secondary winding of a shielded transformer 226. The primary winding of the transformer 226 is connected to receive an alternating voltage such as 115 volts from a commercial source. The transformer 226 is constructed (or shielded) to make certain that short circuits can never be produced between the primary and secondary windings of the transformer, thereby preventing undesirable voltages from being introduced to the elements 68a, 68b, and 69b. Thus the transformer is one protective element in this intrisically safe (from vapor ignition), low energy circuit.

The anodes of the diodes 222 and 224 are connected to the end terminals of the secondary winding of the transformer 226 and the cathodes are connected to a resistance 228 and capacitances 230 included in the full-wave rectifier. Second terminals of the resistance 228 and the capacitances 230 are connected to the center tap of the secondary winding of the transformer. Connections are made from the cathodes of the diodes 222 and 224 to first terminals of resistances 232, 234, 236 and 238, second terminals of which are respectfully connected to first terminals of the diode 68a, the diode 68b , the transistor 69a and the transistor 69b. Second terminals of the transistors 69a and 69b are respectively connected to output leads through resistances 240 and 242. All resistances 232, 234, 235, 238, 240 and 242 are protective elements and are included in the circuit to limit the electrical energy entering hazardous area 223 of the dispenser to intrinsically safe levels (non-ignition of flammable vapors).

Second terminals of the diodes 68a and 68b are connected to the collector of a transistor 244, the emitter of which is grounded and the base of which is connected to one terminal of the transistor 246. A second terminal of the transistor 246 is connected through a resistance 248 to the cathodes of the diodes 222 and 224. The transistor 246 is associated with a light-emitting diode 248, one terminal of which is grounded and the other terminal of which is connected through a resistance 250 to receive a positive voltage of relatively low magnitude such as approximately +5V.

A positive voltage of relatively low magnitude is introduced through the resistance 250 to the diode 248 when an in use signal is produced. This causes the transistor 246 to become conductive so that a positive voltage is introduced to the base of the transistor 244. This positive voltage causes the transistor 244 to become conductive so that a ground potential is effectively introduced to the diodes 68a and 68b, and causes the diodes to emit light. As flow of product thru the dispenser causes successive apertures 202 in the disc 66 to move between the diode 68a and the transistor 69a, the photo-sensitive transistor 69a detects the resulting intermittent light beams. The transistor 69a in turn becomes intermittently conductive and passes the signals for the dollars count through the resistor 240. In like manner and simultaneously, the transistor 69b passes signals through the resistor 242 when the diode 68b becomes conductive and with rotation of disc 67 to indicate increments in the volume (gallons) of the fluid dispensed for the individual dispenser. The circuitry shown in FIG. 7 may be considered to correspond to the diodes 68, the transistors 69 and the pulser drivers 70 and 71 in FIG. 3.

Figure 9:
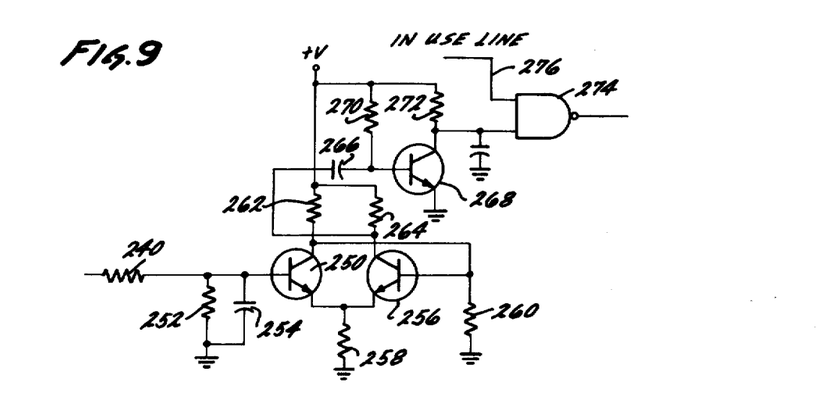
FIG. 9 is a circuit diagram of further stages shown on a somewhat schematic basis in FIG. 3.

The signals passing through the resistor 240 are introduced in FIG. 3 to a pulse shaper 72 which is shown in some detail in FIG. 9. The resistor 240 in FIG. 7 is also indicated in FIG. 9 to show that the electrical signals representing increments in the dollar amount of the product dispensed by an individual diepenser is introduced to the base of a transistor 250 and to first terminals of a parallel network formed by a resistor 252 and a capacitor 254, the other terminals of which are grounded. The transistor 250 is included in a differential amplifier with a transistor 256. The emitters of the transistors 250 and 256 have a common connection with one terminal of a resistor 258, the second terminal of which is grounded. The base of the transistor 256 is connected to one terminal of a resistor 260, the second terminal of the resistor being grounded.

The collectors of the transistors 250 and 256 respectively receive positive voltage through resistors 262 and 264 from a source providing a positive voltage of low magnitude, such as approximately +5V. Signals on the collector of the transistor 256 are also introduced through a coupling capacitor 266 to the base of a transistor 268. A positive potential of relatively low magnitude is also introduced to the base of the transistor 268 through a resistor 270. The emitter of the transistor 268 is grounded and the collector of the transistor 268 has positive potential applied to it through a resistor 272. The signals on the collector of the transistor 268 are introduced to one terminal of "NAND" network 274 having another terminal connected to a line 276 to receive the in use signals.

The transistor 256 is normally conductive and the transistor 250 is normally nonconductive. When the transistor 69a in FIG. 7 becomes conductive to indicate an increment in the dollar amount of the product dispensed by the individual dispenser, it causes a positive signal to be introduced through the resistor 240 to the base of the transistor 250 in FIG. 9. This causes the transistor 250 to become conductive. The resultant decrease in the potential on the collector of the transistor 250 is introduced to the base of the transistor 256 to make the transistor 256 nonconductive. By way of illustration, the transistor 250 becomes conductive and the transistor 256 becomes nonconductive when a signal having an amplitude of at least approximately 3.4 volts is introduced to the base of the transistor 250.

The resistor 262 has a considerably greater value than the resistor 264. Because of this, the voltage produced on the emitter of the transistor 250 during the conductivity of this transistor is closer to ground potential than the voltage produced on the emitter of the transistor 256 while it is conducting. As a result, the transistor 250 remains conductive even when the voltage introduced to the base of the transistor falls considerably below a potential of approximately 3.4 volts. This prevents spurious signals passing through the resistor 240 to the base of the transistor 250 from triggering the transistor 250 to a state of nonconductivity. By way of illustration, the transistor 250 becomes triggered to a state of nonconductivity only when the voltage introduced to the base of the transistor falls below a value of approximately 0.9 volts.

By preventing the transistor 250 from being triggered to a state of nonconductivity until the voltage on the base of the transistor has fallen to a level considerably lower than that required to trigger the transistor to a state of conductivity, the transistor 250 is made insensitive to spurious signals such as noise signals. In this way, the transistor 250 responds only to large signals representing increments in the dollar amount of the product dispensed by the individual dispenser. The effective hysteresis also prevents undesirable extra signals from being generated from mechanical vibrations and slight reverse motions of the disk when otherwise in a static condition near one of the signal threshold levels.

Every time that the transistor 250 is triggered to a state of conductivity and is then triggered to a state of nonconductivity, the transistor 256 becomes alternately nonconductive and conductive. When the transistor 256 becomes conductive, a relatively low potential is introduced from the collector of the transistor 256 to the base of the transistor 268. This causes the transistor 268 to become nonconductive so that a relatively high potential is introduced to the NAND network 274. The NAND network 274 then passes this signal provided that a positive voltage is produced on the line 276 to indicate that the dispenser is in use.

Therefore, when the in-use condition exists, each successive cycle of triggering the transistor 250 in sequence to a state of conductivity and then a state of nonconductivity produces one incremental count in the dollar amount of the product dispensed by the individual dispenser. Similar circuitry to that shown in FIG. 9 is provided and is operative to produce signals from transistors 68b through resistor 242 representing increments in the volume (gallons) of product dispensed for the individual dispenser. Typically, the increment for the amount of fluid dispensed is 0.01 gallon and the monetary increment is 0.001 dollar.

Figure 8:
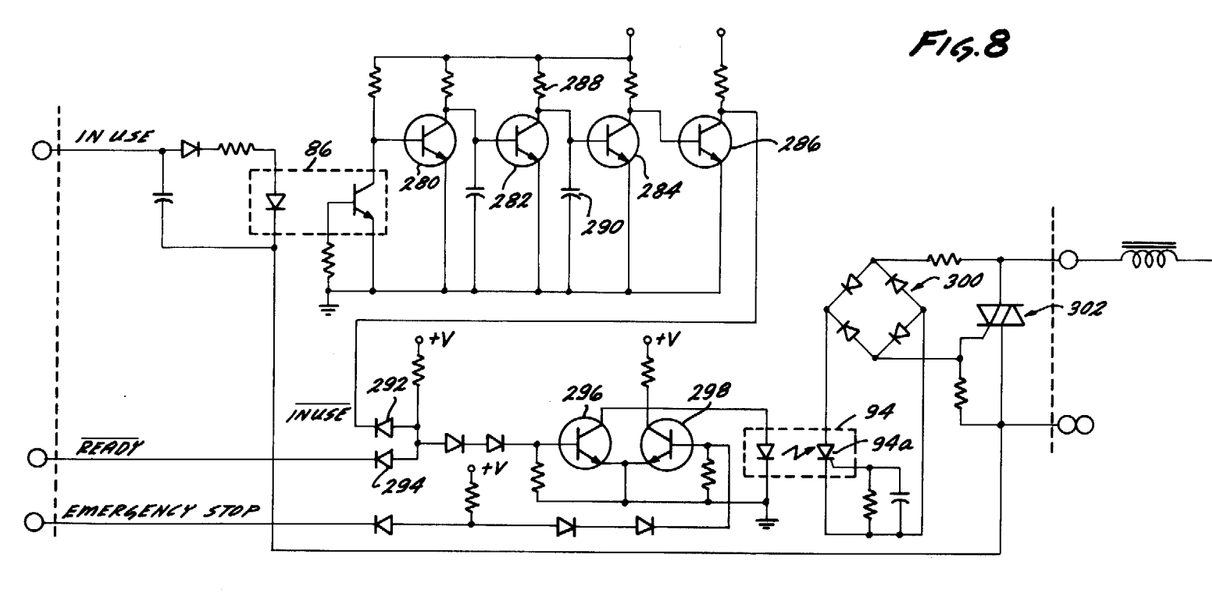
FIG. 8 is a circuit diagram of still other stages shown on a somewhat schematic basis in FIG. 3.

FIG. 8 illustrates in some detail the construction of the photocoupler 86, the delay circuit 88, the triac gate 92, the photocoupler isolator 94 and the triac switch 96 in FIG. 3. In FIG. 8, the "in use" signal is introduced to the photocoupler 86 also shown in FIG. 3. The resultant signal produced by the transistor in the photocoupler is amplified in stages which include transistors 280, 282, 284 and 286. A delay indicated in block form at 88 in FIG. 3 is provided at the output of the stage including the transistor 282 by including a resistor 288 and a capacitor 290 in series and connecting the common terminal between the resistor 288 and the capacitor 290 to the collector of the transistor 282 and the base of the transistor 284. As previously described, this delay in dropping the in-use condition, and the associated pulse counting capability is desirable to make certain that a user does not obtain a small amount of free (uncounted) product (in the order of 2 or 3 cents worth) after he turns off the pump in the dispenser. However, the delay provided by the resistor 288 and the capacitor 290 is sufficiently short so as to prevent the dispenser user from turning off the dispenser to reset the dials to zero, and the restarting to dispense product again before the in-use condition is lost.

The output signal on the collector of the transistor 286 is introduced to a cathode of a diode 292 which is included in an "AND" network with a diode 294. The cathode of the diode 294 is connected to receive the ready (compliment of ready) signal from the "ready" flip-flop 100 in FIG. 3. The AND network formed by the dioded 292 and 294 produces a low voltage when either an in-use signal is not introduced to the diode 292 or a ready signal is not introduced to the diode 294. At such times as an in use signal and a ready signal are simultaneously being produced, a high voltage is obtained from the anodes of the diodes.

The voltage on the anodes of the diodes 292 and 294 is introduced to the base of a transistor 296 which is included in an "NOR" network with a transistor 298. The emitters of the transistors 296 and 298 are grounded and the base of the transistor 298 is connected to receive the emergency stop signal. The collectors of the diodes 296 and 298 are connected to the light-emitting diode in the photocoupler isolator 94 also illustrated in FIG. 3.

The AND network formed by the diodes 292 and 294 and the NOR network formed by the transistors 296 and 298 correspond to the triac gate 92 in FIG. 3. As previously described,a described, a voltage is produced on the anodes of the diodes 292 and 294 when either an in use signal or a ready signal is produced. This low voltage is introduced to the base of the transistor 296 to turn off the transistor. The transistor 298 is also turned off when an emergency stop signal is not being introduced to the base of the transistor 298. Under these conditions, a high voltage is produced on the collectors of the transistors 296 and 298 to make the diode in the photocoupler isolator 94 conductive. This in turn causes a silicon-controlled rectifier 94a in the isolator 94 to become conductive.

When a voltage is produced in the silicon-controlled rectifier 94a, it causes a positive voltage to be produced in a diode bridge 300. This positive voltage in turn causes a switch formed by a back-to-back relationship of two silicon-controlled rectifiers to become conductive. This switch is designated as the triac switch 96 in FIG. 3. When the switch 302 becomes conductive, it causes the ground path to be completed to the reset motor and the relay coil which activates the submerged pump motor for supplying the product from the stored tanks. Power is not applied to the reset motor until switch 46 is activated to turn the dispenser on to dispense product.

The novel functions provided by the apparatus and method of this invention allow complete control of dispensers at a self-service station, with storing of data in such a way that accuracy can be checked by a home office, and the accounting function performed with automated data. Prior to or during a transaction, the sales data from the previous sale on each dispenser can be recalled and displayed. Reset of a dispenser is inhibited while the dispenser is in use. Additional data can be entered manually by the station operator, electronically by the home office. Automatically acquired digital data received from tank inventory gauges can be received, displayed, stored in memory with continual updating, and transmitted by telephone. As will be apparent to those skilled in the art, many other advantageous results are realized from the apparatus and method of this invention.

The preferred embodiments of the apparatus of this invention have been described as utilizing conventional integrated and micro-computer circuits, and other apparatus suitable for use therewith, as well known in the art. However, those skilled in the art will appreciate that different micro-computer programs, logic systems, other types of circuits and different apparatus may be substituted without departing from the scope of the invention. The invention is not limited, therefore, to the specific embodiments shown and described, but only as defined by the appended claims.

We claim:

1. In combination in a dispenser at a gasoline station for producing electrical signals representing the amount of energy fluid dispensed by the dispenser, a first shaft operably connected to the dispenser for rotation thereby in an amount correlated with the amount of fluid dispensed, a second stationary shaft displaced from the first shaft, brace means mounted at one end on the second stationary shaft, means defining a forked frame mounted at one end on the first shaft rotationally free of the first shaft, the forked frame means being attached to the brace means at a position removed from the first shaft and the second stationary shaft, a rotary disc supported on the first shaft between the fork legs of the frame means for rotation with the first shaft, the rotary disc having a plurality of uniformly spaced apertures provided in an annular path of orbit near its periphery, and photocell means disposed on the frame for scanning the apertures in the disc rotates to provide a plurality of electrical signals each representing a predetermined increment in the amount of energy fluid dispensed by the dispenser.

2. The combination set forth in claim 1 wherein the forked frame means supports a pair of spaced apart blocks embracing the path of said aperture orbit and the photocell means include a light source disposed on one of the blocks and a light detector disposed on the other one of the blocks to provide said plurality of electrical signals.

3. The combination set forth in claim 2 wherein the brace means are pivotable relative to the forked frame means to facilitate the mounting of the brace means on the second stationary shaft.

4. In combination in a dispenser at a gasoline station for producing electrical signals representing the amount of energy fluid dispensed by the station, a first shaft operably connected to the dispenser for rotation thereby in an amount correlated with the amount of gasoline dispensed by the dispenser, a second shaft having a stationary disposition, a disc mounted for rotation on said first shaft and having a plurality of apertures equally spaced around the periphery of the disc to provide indication as to the rotation of the disc, first means embracing the disc and supported rotationally free about the first shaft, second means mounted on the second shaft for fixed disposition on the second shaft and operatively coupled to the first means in pivotable relationship to the first means, and photocell means disposed on the first means and positioned relative to the apertures in the disc to produce signals indicative of the quantum rotation of the apertures past the photocell means.

5. The combination set forth in claim 4 wherein the first means include a pair of blocks disposed on opposite sides of the disc and the photocell means include a light source supported by one of the blocks and a detector supported by the other of the blocks and positioned relative to the light source to receive light passing through the apertures from the light source as the apertures rotate past the light source.

6. The combination set forth in claim 5 wherein the light detector converts the pulses of light passing from the light source through the apertures to electrical signals and there is included a remotely located signal accumulator and transmitting means for transmitting the generated signals of said light detector to said accumulator for the accumulation of data represented by the signals.

* * * * *